United States Patent [19]
Hisaaki

[11] Patent Number: 5,438,345
[45] Date of Patent: Aug. 1, 1995

[54] IMAGE FORMING APPARATUS FOR FORMING AN IMAGE ON A RECORDING MEDIUM WHICH CAN AUTOMATICALLY ADJUST OUTPUT LEVELS FROM A RECORDING MEDIUM SENSOR

[75] Inventor: Kawano Hisaaki, Kanagawa, Japan

[73] Assignee: Kabushiki Kaisha Toshiba, Kawashiki, Japan

[21] Appl. No.: 909,661

[22] Filed: Jul. 7, 1992

[30] Foreign Application Priority Data

Jul. 9, 1991 [JP] Japan .................................. 3-168248

[51] Int. Cl.⁶ .............................................. B41J 2/325
[52] U.S. Cl. ................................ 347/218; 250/222.2; 250/223 R; 346/134; 346/136
[58] Field of Search ................... 346/76 PH, 134, 136; 250/222.2, 223 R, 561

[56] References Cited

U.S. PATENT DOCUMENTS

4,975,715 12/1990 Saito et al. ...................... 346/76 PH

Primary Examiner—Huan H. Tran
Attorney, Agent, or Firm—Banner & Allegretti, Ltd.

[57] ABSTRACT

An image forming apparatus for forming an image on a recording medium includes a first sensor for detecting a supply of the recording medium, a second sensor for detecting the type of the recording medium and a third sensor for detecting the size of the recording medium. The image forming apparatus of the present invention automatically determines threshold values of first, second and third sensors by feeding the recording medium so as to adjust output levels of first, second and third sensors. The image forming apparatus may thereby print the image on the recording medium in accordance with the size and the type of the recording medium detected by the second and third sensors when the first sensor detects the supply of the recording medium.

14 Claims, 5 Drawing Sheets

IMAGE FORMING APPARATUS FOR FORMING AN IMAGE ON A RECORDING MEDIUM WHICH CAN AUTOMATICALLY ADJUST OUTPUT LEVELS FROM A RECORDING MEDIUM SENSOR

BACKGROUND OF THE INVENTION

1. Field of the Invention

This invention relates to an image forming apparatus, such as a thermal transfer printing apparatus or an electrophotographic copying machine, for forming an image on a recording medium, such as a paper sheet.

2. Description of the Related Art

U.S. Pat. No. 4,975,715 discloses a thermal transfer printing apparatus. In the thermal transfer printing apparatus, a recording medium, for example, a paper sheet or an over head projector (OHP) sheet, is conveyed to a platen drum and is wound around an outer circumferential surface of the platen drum. A thermal head presses an ink ribbon including, for example, four color recording regions (yellow, cyan, magenta and black) against the recording medium wound around the platen drum. The thermal head is then energized and heated such that ink in one or more of the four color regions is melted and transferred onto the recording medium. Thereby, a desired color image may be printed on the recording medium.

The printing apparatus includes a supply sensor for detecting a supply of the recording medium, a type sensor for detecting the type of the recording medium and a size sensor for detecting the size of the recording medium. Thereby, the printing apparatus can form images in accordance with the type and the size of the recording medium detected by the type sensor and the size sensor, respectively, when the supply sensor detects the supply of the recording medium.

However, these sensors may have varying output levels due to the mounting states thereof, the sensitivities thereof and the foreign particles, such as dust, toner or ink within the apparatus. The printing apparatus therefore has to adjust the output levels from these sensors so as to correctly detect the supply of the recording medium, the type of the recording medium and the size of the recording medium.

The conventional apparatus includes an adjusting circuit for adjusting the output levels, such that the output levels may be adjusted by controlling the sensitivity of the adjustment circuit by servicemen. Thus, in the conventional apparatus, it takes a long time to adjust the output levels from the supply sensor, the type sensor and the size sensor. Also, users may not adjust the output levels from the supply sensor, the type sensor and the size sensor.

SUMMARY OF THE INVENTION

Accordingly, it is an object of the present invention to provide an image forming apparatus which can automatically and simply adjust output levels from a supply sensor, a type sensor and a size sensor.

It is an another object of the present invention to provide an image forming apparatus which may adjust the output levels from the supply sensor, the type sensor and the size sensor by feeding a recording medium.

Accordingly, the foregoing objectives, as well as others, are achieved by the present invention, which provides an image forming apparatus for forming an image on a recording medium. The image forming apparatus comprises a feeding device for feeding the recording medium, a detecting device for detecting the recording medium fed by the feeding device and a determining device for automatically determining a threshold value of the detecting device by feeding the recording medium so as to adjust the output level of the detecting device.

In accordance with another aspect of the present invention, the above-stated objects are achieved by providing an image forming apparatus for forming an image on a recording medium. The image forming apparatus comprises a feeding device for feeding the recording medium, a detecting device for detecting characteristics of the recording medium fed by the feeding device, a control device for controlling the detecting device, the control device including a first device for operating the detecting device so as to detect a first output level of the detecting device when the recording medium is not fed by the feeding device and a second device for operating the detecting device so as to detect a second output level of the detecting device when the recording medium is fed by the feeding device and a determining device for automatically determining a threshold value of the detecting device in accordance with the detected first and second output levels.

BRIEF DESCRIPTION OF THE DRAWINGS

A more complete appreciation of the present invention and many of the attendant advantages thereof will be readily obtained as the invention becomes better understood by reference to the following detailed description, when considered in connection with the accompanying drawings, wherein.

DETAILED DESCRIPTION OF THE PREFERRED EMBODIMENTS

Figure 1:
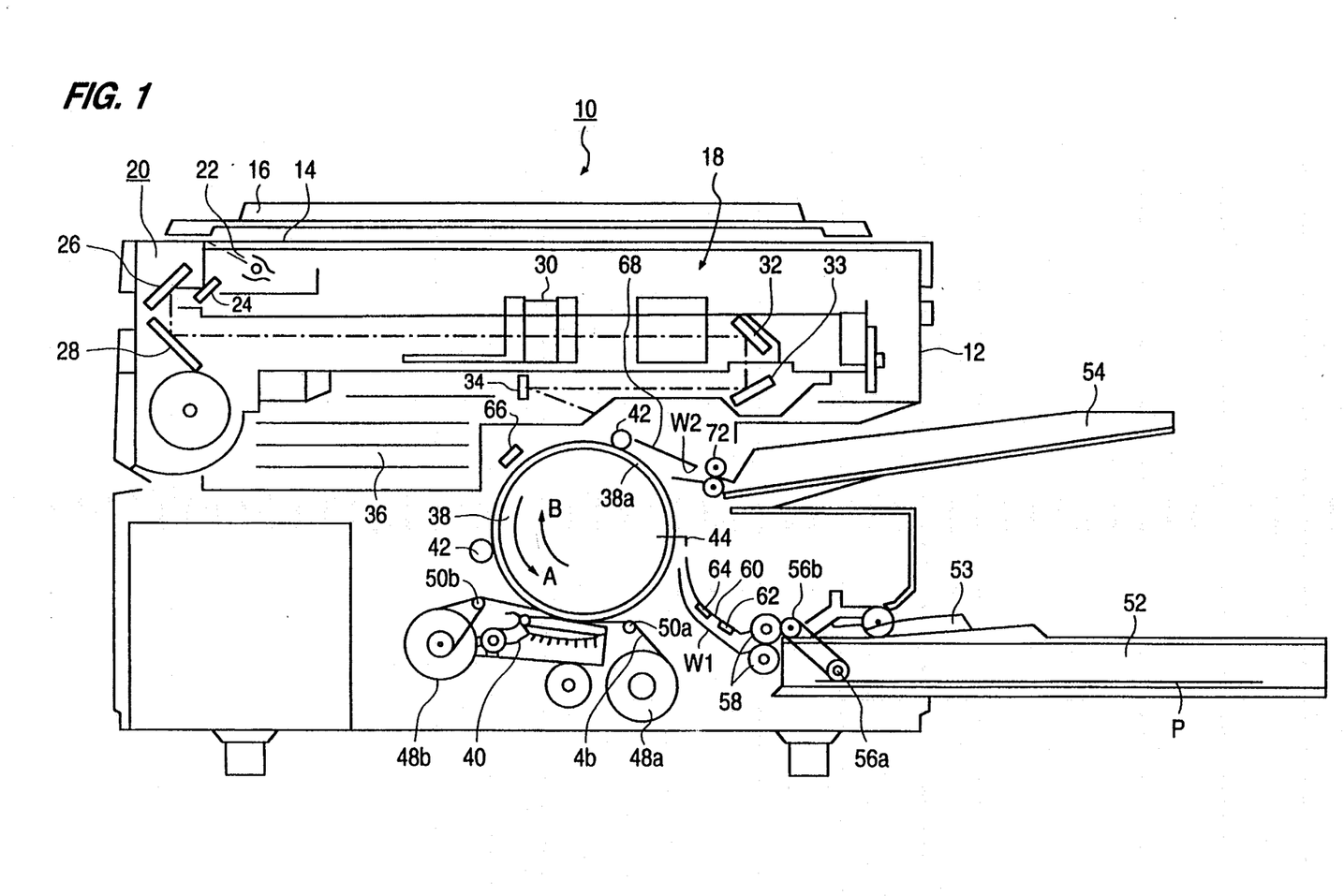
FIG. 1 is a sectional view of an image forming apparatus according to the present invention.

In the following detailed description, similar reference numerals will be used to denote similar elements in FIGS. 1 to 5. FIG. 1 shows an image forming apparatus according to the present invention. The image forming apparatus may be, of course, one of a wide variety known in the prior art. For purpose of example, however, the image forming apparatus depicted is a thermal transfer printing apparatus 10.

Thermal transfer printing apparatus 10 includes a housing 12. Document table 14 and document cover 16 are provided on the upper surface of housing 12. Document table 14 is formed of transparent glass. Original document is set on document table 14. A document cover 16 may be opened away from document table 14.

Thermal transfer printing apparatus 10 also includes an image forming unit 18 for forming an image on a recording medium P, for example, a paper sheet or an over head projector (OHP) sheet. Image forming unit 18 includes an optical unit 20 for optically scanning the original document supported on document table 14. Optical unit 20 includes an exposure lamp 22 for emitting a light onto the original document set on document table 14. Light emitted from exposure lamp 22 is reflected by the original document and directed to CCD line sensor 34 through first, second and third reflecting mirrors 24, 26 and 28, a variable magnification lens block 30 and fourth and fifth reflecting mirrors 32 and 33. Exposure lamp 22 and first reflecting mirror 24 are mounted on a first carriage (not shown). Thereby, exposure lamp 22 and first reflecting mirror 24 reciprocally move between both end portions of document table 14 in the lengthwise direction so as to read out an image on the original document. Second and third reflecting mirrors 28 and 30 are mounted on a second carriage (not shown). The second carriage moves through a distance which is half of the traveling distance of the first carriage.

Variable magnification lens block 30 can move along an optical axis according to the image forming magnification. CCD line sensor 34 receives the light reflected from the original document set on document table 14. CCD line sensor 34 includes, for example, yellow, cyan and magenta filters (not shown).

Thermal transfer printing apparatus 10 also includes a printer controller 36 for controlling the printing operation thereof. Printer controller 36 is coupled to CCD line sensor 34 and receives the image data output from CCD line sensor 34 so as to control the printing operation.

Image forming unit 18 also includes a platen drum 38 and a thermal head 40. Platen drum 38 is disposed substantially in the center of housing 12 and is rotatable in both directions of arrows A and B. Platen drum 38 has an outer circumferential portion 38a formed of an elastic material such as rubber. Recording medium P is wound around outer circumferential portion 38a of platen drum 38. The circumference of platen drum 38 is slightly longer than the length of the largest recording medium which can be used in apparatus 10. A plurality of press rollers 42 and a clipper 44 is provided on platen drum 38. Press rollers 42 are arranged around platen drum 38 and press recording medium P against outer circumferential portion 38a of platen drum 38. Clipper 44 clips the forward end of recording medium P.

Thermal head 40 is disposed such that it can be set either in contact with or apart from platen drum 38. Thermal head 40 includes a plurality of heat generating elements (not shown) arranged along the lengthwise direction of platen drum 38.

Figure 2:
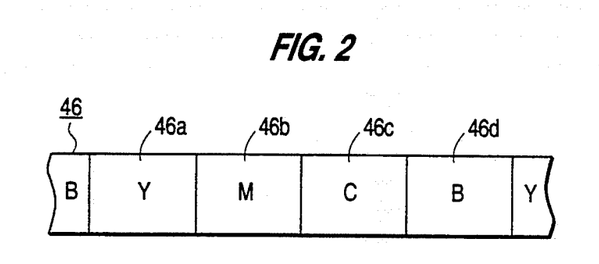
FIG. 2 is a plan view of an ink ribbon of the image forming apparatus shown in FIG. 1.

An ink ribbon 46 is contained in an ink ribbon cartridge (not shown) detachably mounted on thermal transfer printing apparatus 10. The cartridge includes a ribbon supply section 48a for supplying ink ribbon 46 and a ribbon winding section 48b for winding ink ribbon supplied from ribbon supply section 48a. Ribbon supply section 48a and ribbon winding section 48b extend in parallel to each other with a predetermined distance therebetween. Ink ribbon 46 extends through between platen drum 38 and thermal head 40 and is guided by a pair of guide rollers 50a and 50b when the ink ribbon cartridge is mounted on apparatus 10. Ink ribbon 46 includes color ink areas each of which are of substantially the same size as recording medium P and are repetitively arranged. As shown in FIG. 2, the color ink areas include, for example, yellow (Y) ink area 46a, magenta (M) ink area 46b, cyan (C) ink area 46c and black (B) ink area 46d. When a color image is printed, four color ink areas 46a, 46b, 46c and 46d of ink ribbon 46 are used.

Referring again to FIG. 1, in the printing operation, ink ribbon 46 is pressed against platen drum 38 by thermal head 40. Also, press rollers 42 act to press recording medium P against platen drum 38. Platen drum 38 and ink ribbon 46 are driven with recording medium P pressed against platen drum 38 by press rollers 42. In this way, recording medium P can be correctly fed and carried by pressing recording medium P against platen drum 38 by means of press rollers 42. The heat generating elements of thermal head 40 are energized in accordance with the image read out by printer controller 36. Thereby, the ink of ink ribbon 46 is melted and transferred to recording medium P held between ink ribbon 46 and platen drum 38.

A paper supply cassette 52 is inserted into a lower portion of housing 12. Cassette 52 holds a supply of recording medium P, for example paper sheets. A manual feeding tray 53 is arranged above paper supply cassette 52. Manual feeding tray 53 is used as a guide for manually feeding an individual recording medium P, for example, an over head projector (OHP) sheet. An output tray 54 is located on an upper portion of housing 12 to receive printed recording medium P output from thermal printing apparatus 10.

A pickup roller 56a for picking up recording medium P from paper supply cassette 52 is provided at the top end of cassette 52 when cassette 52 is inserted into housing 12. Also, a pickup roller 56b for picking up recording medium P from manual feeding tray 53 is located on the end of manual feeding tray 53. Recording medium P, when picked up from paper supply cassette 52 or manual feeding tray 53, is then transported one by one to platen drum 38 through a separating roller 58 and a feeding path W1. First feeding path W1 has a feeding guide 60 for guiding recording medium P to platen drum 38. First feeding path W1 also includes a supply sensor 62 for detecting a supply of recording medium P and a type sensor 64 for detecting the type of recording medium P, for example, paper sheet or over head projector (OHP) sheet. A size sensor 66 for detecting the size of recording medium P fed by first feeding path W1 is arranged around the periphery of platen drum 38. Size sensor 66 includes seven emitting diodes and photodiodes (not shown) for detecting the size of recording medium P.

A second feeding path W2 is located between platen drum 38 and output tray 54. Recording medium P from platen drum 38 is transported to output tray 54 along second feeding path W2. Second feeding path W2 has feeding guides 68 and a pair of discharge rollers 72.

Figure 3:
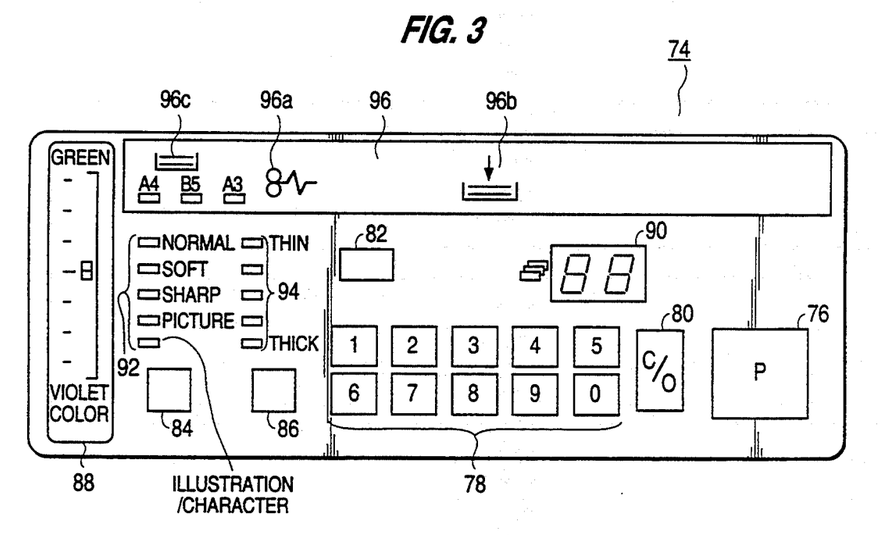
FIG. 3 is a plan view of an operation panel of the image forming apparatus shown in FIG. 1.

As shown in FIG. 3, thermal transfer printing apparatus 10 includes an operation panel 74 which is provided on the front portion of the upper surface of housing 12. Operation panel 74 includes a print key 76 for instructing the start of the printing operation, ten keys 78 for setting the number of printing, a clear/stop key 80 for instructing the release of the designation of the number of printing and the stop of the printing operation, a selection key 82 for selecting the size of recording medium P to be used, a document mode key 84 for selecting a print mode in accordance with the image formed on the original document, a concentration designating key 86 for designating the concentration of printing, for example, in five steps, and a tone of color setting section 88 for setting a tone of color of the printed image. Operation panel 74 also includes a first display section 90 for displaying the number of copies to print as set by ten keys 78 and so on, a second display section 92 for displaying the print mode selected by document mode key 84, a third display section 94 for displaying the concentration selected by concentration designating key 86 and a fourth display section 96 for displaying a plurality of information with respect to the printing operation. For example, fourth display section 96 includes a first display portion 96a for lighting when recording medium P is jammed in housing 12, a second display portion 96b for displaying the mounting state of cassette 52 and the presence of recording medium P in paper supply cassette 52 and a third display portion 96c for displaying the size of recording medium P in paper supply cassette 52.

Figure 4:
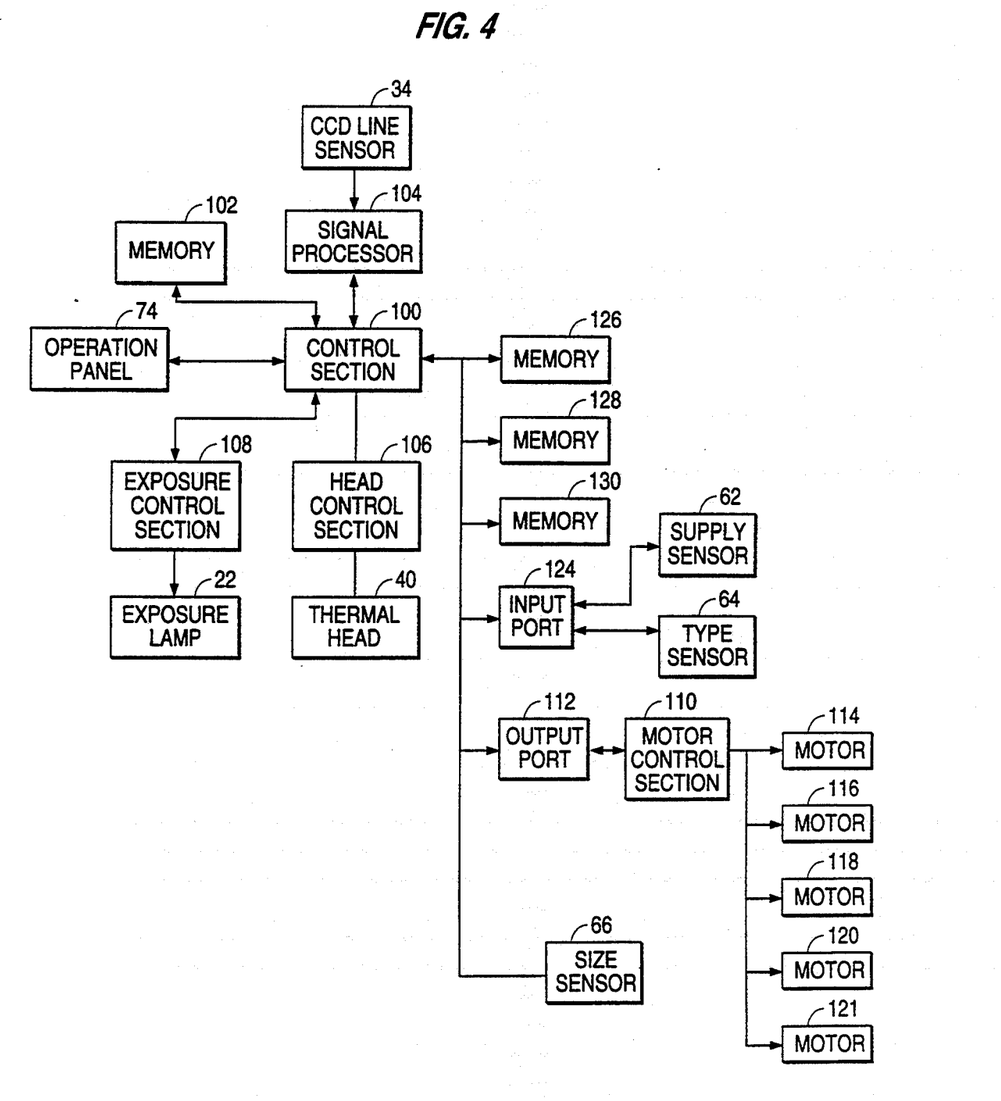
FIG. 4 is a block diagram showing an arrangement of a printer controller of the image forming apparatus shown in FIG. 1.

FIG. 4 shows an arrangement of a main part of a printer controller 36 of thermal transfer printing apparatus 10.

Referring to FIG. 4, printer controller 36 includes a control section 100 for performing overall control of thermal transfer printing apparatus 10 and a memory 102 for storing a control program. Control section 100 is operated in accordance with the control program stored in memory 102. Printer controller 36 includes a signal processor 104 which is coupled to CCD line sensor 34. Signal processor 104 includes a memory (not shown) for storing image data output from CCD line sensor 34 and generates image signals corresponding to yellow, magenta, cyan and black images based on the stored image data. Printer controller 36 also includes a head control section 106, an exposure control section 108 and a motor control section 110. Head control section 106 drives thermal head 40 according to image signals output from signal processor 104. Exposure control section 108 controls the exposure operation of exposure lamp 22 of optical unit 20. Motor control section 110 is coupled to control section 100 through an output port 112 and controls the operation of a first motor 114 for driving optical unit 20, a second motor 116 for driving lens block 30, a third motor 118 for driving platen drum 38, a fourth motor 120 for driving ink ribbon 46 and a fifth motor 121 for driving pickup rollers 56a and 56b, separating rollers 58 and the like. Control section 100 is coupled to supply sensor 62 and type sensor 64 through an input port 124, and is coupled to size sensor 66 directly. Printer controller 36 includes a memory 126 for storing output levels from supply sensor 62, a memory 8 for storing output levels from type sensor 64 and a memory 130 for storing output levels from size sensor 66.

The printing operation of thermal transfer printing apparatus 10 will be described with reference to FIGS. 1 to 4.

The operator of the present invention sets an original document on document table 14 and designates the number of recording medium P to be printed by depressing one or more of ten keys 78 of operation panel 74. Thereafter, print key 76 is depressed by the operator and a command is supplied from control section 100 to exposure control section 108 to turn on exposure lamp 22. At this time, a command is supplied from control section 100 to motor control section 110 such that motor control section 110 may drive first, second, third, fourth and fifth motors 114, 116, 118, 120 and 122. Thereby, optical unit 20 emits the light on the original document to read the image formed on original document by CCD line sensor 34. Also, recording medium P is fed from paper supply cassette 52 to the print starting position for printing and platen drum 38 is rotated in the direction of arrow A.

The image data read by CCD line sensor 34 is stored in the memory of signal processor 104. Signal processor 104 generates the image signal corresponding to the image to be printed in yellow ink area 46a of ink ribbon 46 based on the stored image data, and supplies the image signal to head control section 106. Head control section 106 drives thermal head 40 according to the received image signal, such that thermal head 40 may print the image on recording medium P in yellow ink of yellow ink area 46a. Printed recording medium P is held between platen drum 38 and press rollers 42.

After the printing operation using yellow ink area 46a of ink ribbon 46 is completed, thermal head 40 is set apart from platen drum 38. Platen drum 38 is rotated in the direction of arrow B which is a reverse direction with respect to the direction of arrow A, so as to set the printed recording medium P held between platen drum 38 and press rollers 42 to the print starting position. When recording medium P is set in the print starting position again, thermal head 40 is set in contact with platen drum 38.

Signal processor 104 generates the image signal corresponding to an image to be printed in magenta ink area 46b of ink ribbon 46 based on the stored image data, and supplies the image signal to thermal head 40 through control section 100 and head control section 106. At the same time, platen drum 38 is rotated in the direction of arrow A by third motor 118 and ink ribbon 46 is driven by fourth motor 120. Thereby, thermal head 40 may print the image on recording medium P with the magenta ink of magenta ink area 46b, the yellow image already having been printed on recording medium P with the yellow ink of yellow ink area 46a.

Next, recording medium P is set at the print starting position after each color ink is printed, and image signals corresponding to cyan and black inks are sequentially generated by signal processor 104. Then, images are sequentially printed in cyan and black inks respectively on recording medium P by thermal head 40 based on the generated image signals by thermal head 40. Thereby, color images are printed on recording medium P held between platen drum 38 and press rollers 42.

When the printing operation by black ink area 46d of ink ribbon 46 is completed, recording medium P is fed to output tray 54 through second feeding path W2.

Figure 5A:
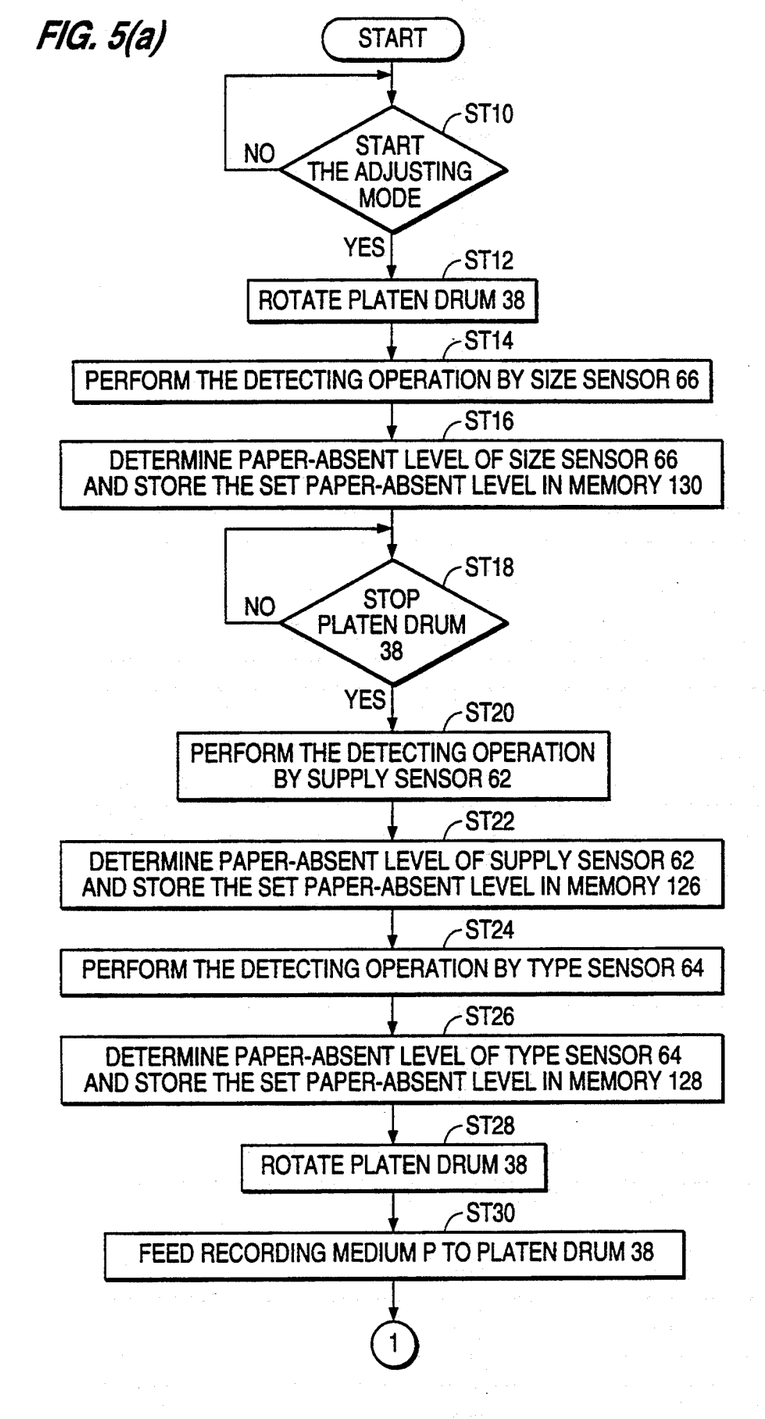
FIGS. 5(a) and 5(b) are flow charts showing an adjusting operation of the image forming apparatus shown in FIG. 1.
Figure 5B:
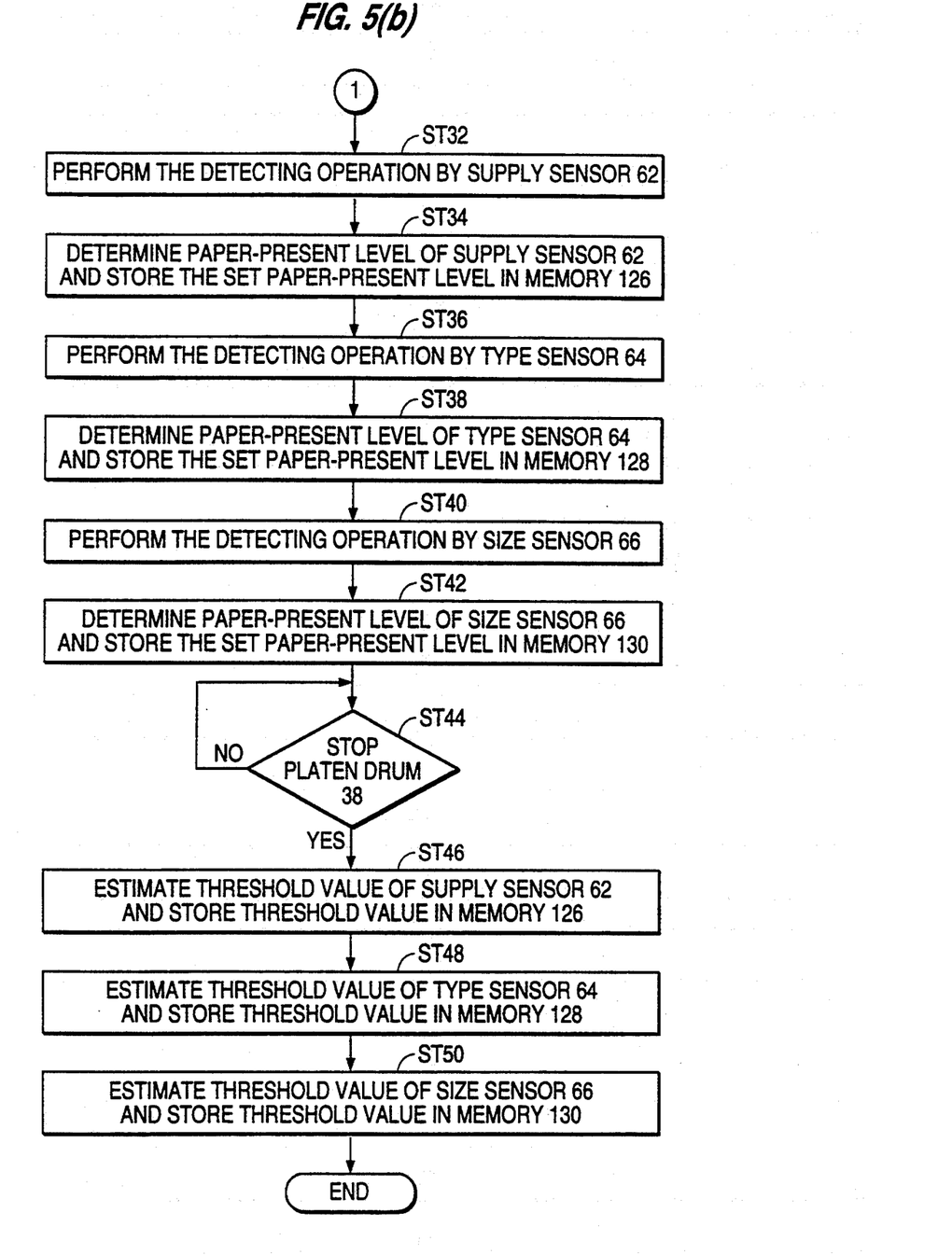

Referring now to FIGS. 5(a) and 5(b), the adjusting operation of supply sensor 62, type sensor 64 and size sensor 66 will be described.

The operator of the present invention designates an adjusting mode by using operation panel 74. For example, the operator may simultaneously press the "0" key and the "1" key of ten keys 78 and switch on a power supply of apparatus 10 (step ST10). Platen drum 38 is then rotated in the direction of arrow A by third motor 118 (step ST12). In this state, control section 100 controls size sensor 66 so as to detect the output levels of size sensor 66 in the case of the absence of recording medium P (hereinafter referred to as a "paper-absent level"), such that size sensor 66 performs the detecting operation a plurality of times (step ST14). Control section 100 determines the paper-absent level of size sensor 66 from the detected output levels and stores the paper-absent level in memory 130 (step ST16). Next, platen drum 38 is stopped (step ST18). In this state, control section 100 controls supply sensor 62 and type sensor 64 so as to detect the paper-absent levels of supply sensor 62 and type sensor 64. Thereby, supply sensor 62 performs the detecting operation a plurality of times so as to detect the average paper-absent level thereof (step ST20). Control section 100 determines the paper-absent level of supply sensor 62 from the detected output levels and stores the paper-absent level in memory 126 (step ST22). Also, type sensor 64 performs the detecting operation a plurality of times so as to detect the average paper-absent level thereof (step ST24). Control section 100 determines the paper-absent level of type sensor 64 from the detected output levels and stores the paper-absent level in memory 128 (step ST26).

Next, control section 100 controls motor control section 110 so as to drive platen drum 38, pickup rollers 56a and 56b, separating roller 58 and so on. Platen drum 38 is rotated in the direction of arrow A by third motor 118 (step ST28). Recording medium P is thereby fed to platen drum 38 by pickup rollers 56a and 56b and separating roller 58 (step ST30). In this state, control section 100 controls supply sensor 62 so as to detect the output levels in the case of the presence of recording medium (hereinafter referred to as a "paper-present level"), such that supply sensor 62 performs the detecting operation a plurality of times (step ST32). Control section 100 determines the paper-present level of supply sensor 62 from the detected output levels and stores the paper-present level in memory 126 (step ST34). Control section 100 also controls type sensor 64 and size sensor 66. Type sensor 64 thereby performs the detecting operation a plurality of times so as to detect the average paper-present level thereof (step ST36). Control section 100 determines the paper-present level of type sensor 64 from the detected output levels and stores the paper-present level in memory 128 (step ST38). Size sensor 66 performs the detecting operation a plurality of times so as to detect the average paper-present level thereof (step ST40). Control section 100 determines the paper-present level of size sensor 66 from the detected output levels and stores the paper-present level in memory 130 (step ST42).

Thereafter, platen drum 38 is stopped (step ST44). Control section 100 reads the paper-absent level and the paper-present level of supply sensor 62 from memory 126. Control section 100 estimates a threshold value between the paper-absent level and the paper-present level of supply sensor 62 and stores the estimated threshold value in memory 126 (step ST46). The threshold value is that value above which corresponds to the paper-absent level and below which corresponds to the paper-present level. Next, control section 100 reads the paper-absent level and the paper-present level of type sensor 64 from memory 128. Control section 100 estimates a threshold value between the paper-absent level and the paper-present level of type sensor 64 in similar manner as above and stores the estimated threshold value in memory 128 (step ST48). Finally, control section 100 reads the paper-absent level and the paper-present level of size sensor 66 from memory 130. Control section 100 estimates a threshold value between the paper-absent level and the paper-present level of size sensor 66 in a similar manner as above and stores the estimated threshold value in memory 130 (step ST50). Platen drum 38 is rotated in the direction of arrow B by third motor 118, such that recording medium P is fed to output tray 54 and the adjusting operation of supply sensor 62, type sensor 64 and size sensor 66 is completed.

The above adjusting operation, in particular the determining operation of paper-absent levels, paper-present levels and threshold values of supply sensor 62, type sensor 64 and size sensor 66, will now be described in more detail.

When control section 100 determines the paper-absent level of size sensor 66, size sensor 66 performs the detecting operation four times so as to detect the average paper-absent level thereof. Control section 100 calculates the average level of the four measurements (C1, C2, C3 and C4) and sets a paper-absent level (MC) of size sensor 66 as follows;

$$MC = (C1 + C2 + C3 + C4)/4 \quad (1)$$

Supply sensor 62 also performs the detecting operation four times so as to detect the average paper-absent level thereof. Control section 100 calculates the average level of the four measurements (A1, A2, A3 and A4) and sets a paper-absent level (MA) of supply sensor 62 as follows;

$$MA = (A1 + A2 + A3 + A4)/4 \quad (2)$$

Type sensor 64 performs the detecting operation four times so as to detect the average paper-absent level thereof. Control section 100 calculates the average level of the four measurements (B1, B2, B3 and B4) and sets a paper-absent level (MB) of type sensor 64 as follows:

$$MB = (B1 + B2 + B3 + B4)/4 \quad (3)$$

Next, when control section 100 determines the paper-present levels of size sensor 66, size sensor 66 performs the detecting operation four times so as to detect the paper-present level thereof. Control section 100 calculates the average level of the four measurements (c1, c2, c3 and c4) and sets a paper-present level (Mc) of size sensor 66 as follows;

$$Mc = (c1 + c2 + c3 + c4)/4 \quad (4)$$

Supply sensor 62 and type sensor 64 also perform the detecting operation four times so as to detect the average paper-present levels thereof, respectively. Control section 100 calculates the average level of the four measurements (a1, a2, a3 and a4) and (b1, b2, b3 and b4), and sets paper-present levels (Ma) and (Mb) of supply sensor 62 and type sensor 64 as follows;

$$Ma = (a1 + a2 + a3 + a4)/4 \quad (5)$$

$$Mb = (b1 + b2 + b3 + b4)/4 \quad (6)$$

Control section 100 estimates a threshold value (THA) of supply sensor 62 from paper-absent level (MA) and paper-present level (Ma) of supply sensor 62 as follows:

$$THA = (MA - Ma)/2 + Ma \quad (7)$$

Threshold value (THA) of supply sensor 62 is determined to be an intermediate value between paper-absent level (MA) and paper-present level (Ma).

Control section 100 respectively estimates threshold values (THB) and (THC) of type sensor 64 and size sensor 66 as follows:

$$THB = (MB - Mb)/2 + Mb \qquad (8)$$

$$THC = (MC - Mc)/2 + Mc \qquad (9)$$

Threshold value (THB) of type sensor 64 is determined to be an intermediate value between paper-absent level (MB) and paper-present level (Mb) of type sensor 64. Similarly, threshold value (THC) of type sensor 66 is determined to be intermediate value between paper-absent level (MC) and paper-present level (Mc) of type sensor 66.

Thus, control section 100 may determine threshold values (THA), (THB) and (THC) of supply sensor 62, type sensor 64 and size sensor 66 so as to adjust the output levels from supply sensor 62, type sensor 64 and size sensor 66.

As described above, in the present embodiment, control section 100 automatically determines threshold values (THA), (THB) and (THC) of supply sensor 62, type sensor 64 and size sensor 66 by feeding recording medium P to adjust the output levels from supply sensor 62, type sensor 64 and size sensor 66. Thereby, supply sensor 62, type sensor 64 and size sensor 66 correctly detect the supply of recording medium P, the type of recording medium P and the size of recording medium P regardless of the mounting states and sensitivities of sensors 62, 64 and 66, and the foreign particles within housing 12. Thus, thermal transfer printing apparatus 10 may print the image on recording medium P in accordance with the size and type of recording medium P detected by type sensor 64 and size sensor 66 when supply sensor 62 detects the supply of recording medium P. In the present embodiment, it is very easy for users to adjust the output levels from supply sensor 62, type sensor 64 and size sensor 66.

In the embodiment described above, the kind of apparatus to which supply sensor 62, type sensor 64, size sensor 66 and control section 100, and so on, are applicable is not limited to thermal transfer printing apparatus but may be applicable to any image forming apparatus known in the art, for example, an electrophotographic copying machine and a laser printer.

It should be understood that the detailed description and example, which indicates presently preferred embodiments of this invention, are given by way of illustration only. Various modifications and changes may be made to the present invention, without departing from the scope or spirit of the invention, as set forth in the following claims.

I claim:

1. An image forming apparatus for forming an image on a recording medium, comprising:
   means for feeding the recording medium;
   means for forming an image on the recording medium fed by said feeding means;
   means for detecting the recording medium fed by said feeding means; and
   means for automatically determining a threshold value of said detecting means by causing said feeding means to selectively feed the recording medium so as to adjust an output level of said detecting means.

2. An image forming apparatus according to claim 1, wherein said detecting means includes first detecting means for detecting a supply of the recording medium, second detecting means for detecting the type of the recording medium and third detecting means for detecting the size of the recording medium.

3. An image forming apparatus according to claim 1, wherein said determining means includes a control section for controlling said detecting means to detect an output level of said detecting means when the recording medium is not fed by said feeding means and an output level of said detecting means when the recording medium is fed by said feeding means and a calculating section for calculating the threshold value of said detecting means in accordance with said detected output levels.

4. An image forming apparatus according to claim 3, wherein said control section controls said detecting means to perform detection of the recording medium a plurality of times when the recording medium is not fed by said feeding means and a plurality of times when the recording medium is fed by said feeding means.

5. An image forming apparatus according to claim 4, wherein said calculating section calculates the average level of a plurality of measurements of said detecting means.

6. An image forming apparatus according to claim 1, further comprising memory means for storing the threshold value of said detecting means set by said determining means.

7. An image forming apparatus for forming an image on a recording medium, comprising:
   means for feeding the recording medium;
   means for forming an image on the recording medium fed by said feeding means;
   means for detecting the recording medium fed by said feeding means;
   control means for controlling said detecting means, said control means including first means for operating said detecting means so as to detect a first output level of said detecting means when the recording medium is not fed and second means for operating said detecting means so as to detect a second output level of said detecting means when the recording medium is fed; and
   means for automatically determining a threshold value of said detecting means in accordance with detected first and second output levels.

8. An image forming apparatus according to claim 7, wherein said detecting means includes first detecting means for detecting a supply of said recording medium, second detecting means for detecting the type of said recording medium and third detecting means for detecting the size of said recording medium.

9. An image forming apparatus according to claim 8, wherein said first means includes means for operating said detecting means so as to perform detection of the recording medium a plurality of times and said second means includes means for operating said detecting means so as to perform detection of the recording medium a plurality of times.

10. An image forming apparatus according to claim 9, wherein said control means further comprises calculating means for calculating the average level of a plurality of measurements of said detecting means so as to set said first and second output levels of said detecting means.

11. An image forming apparatus according to claim 7, wherein said determining means includes estimating means for estimating said threshold value of said detecting means to be an intermediate value between said first output level and said second output level.

12. An image forming apparatus according to claim 7, further comprising memory means for storing the threshold value of said detecting means set by said determining means.

13. A method for determining a threshold value of a detecting device for detecting a recording medium fed in an image forming apparatus, wherein said image forming apparatus is adapted for forming an image on the recording medium, said method comprising the steps of:
- detecting a first output level of said detecting device when the recording medium is not fed in said image forming apparatus;
- detecting a second output level of said detecting device when the recording medium is fed in said image forming apparatus; and
- determining said threshold value of said detecting device in accordance with said first and second output levels so as to correctly detect the recording medium fed in said image forming apparatus.

14. A method for determining a threshold value of a detecting device for detecting a recording medium fed in an image forming apparatus for forming an image on the recording medium, said method comprising the steps of:
- detecting first output levels of said detecting device a plurality of times when said recording medium is not fed in said image forming apparatus;
- calculating a first average output level of said plurality of detected first output levels when the recording medium is not fed in said image forming apparatus;
- detecting second output levels of said detecting device a plurality of times when the recording medium is fed in said image forming apparatus;
- calculating a second average output level of said plurality of detected second output levels when the recording medium is fed in said image forming apparatus; and
- estimating said threshold value of said detecting device to be an intermediate value between said first average output level and said second average output level.

* * * * *